(12) United States Patent
Han

(10) Patent No.: US 8,929,341 B2
(45) Date of Patent: Jan. 6, 2015

(54) ACCESS POINT FOR SURVEILLANCE OF ANOMALOUS DEVICES

(71) Applicant: Meru Networks, Sunnyvale, CA (US)

(72) Inventor: Sung-Wook Han, Sunnyvale, CA (US)

(73) Assignee: Meru Networks, Sunnyvale, CA (US)

( * ) Notice: Subject to any disclaimer, the term of this patent is extended or adjusted under 35 U.S.C. 154(b) by 0 days.

(21) Appl. No.: 13/858,006

(22) Filed: Apr. 6, 2013

(65) Prior Publication Data

US 2014/0301363 A1 Oct. 9, 2014

(51) Int. Cl.
*H04W 4/00* (2009.01)
*H04W 12/08* (2009.01)
*H04W 36/00* (2009.01)
*H04W 24/00* (2009.01)
*G06F 15/173* (2006.01)
*H04M 1/66* (2006.01)

(52) U.S. Cl.
CPC .......... *H04W 36/0077* (2013.01); *H04W 12/08* (2013.01); *H04W 24/00* (2013.01)
USPC ............................ 370/331; 709/224; 455/410

(58) Field of Classification Search
None
See application file for complete search history.

(56) References Cited

U.S. PATENT DOCUMENTS

| 2006/0153138 | A1* | 7/2006 | Asoh et al. ..................... 370/332 |
| 2007/0049323 | A1* | 3/2007 | Wang et al. .................... 455/525 |
| 2007/0298720 | A1* | 12/2007 | Wolman et al. .............. 455/66.1 |
| 2008/0002651 | A1* | 1/2008 | Nakano ......................... 370/338 |
| 2008/0151844 | A1* | 6/2008 | Tiwari ........................... 370/338 |
| 2008/0186932 | A1* | 8/2008 | Do et al. ........................ 370/338 |
| 2009/0235354 | A1* | 9/2009 | Gray et al. ...................... 726/22 |
| 2011/0083165 | A1* | 4/2011 | Gopinath et al. .................. 726/4 |
| 2011/0131651 | A1* | 6/2011 | Shanmugavadivel et al. .. 726/22 |
| 2011/0258681 | A1* | 10/2011 | Iyer et al. .......................... 726/3 |
| 2012/0052876 | A1* | 3/2012 | Anderson et al. .......... 455/456.1 |
| 2012/0134272 | A1* | 5/2012 | Vempati et al. ............... 370/241 |
| 2014/0118113 | A1* | 5/2014 | Kaushik et al. ................ 340/8.1 |

\* cited by examiner

*Primary Examiner* — Clemence Han
(74) *Attorney, Agent, or Firm* — Law Office of Dorian Cartwright

(57) ABSTRACT

An access point switches between an access point mode and a surveillance mode. In the access point mode, the access point provides network access for end stations using a BSSID (Basic Service Set Identifier) while in the access point mode. In surveillance mode, the access point scans one or more channels of the wireless network to identify one or more anomalous devices.

14 Claims, 6 Drawing Sheets

ACCESS POINT FOR SURVEILLANCE OF ANOMALOUS DEVICES

FIELD OF THE INVENTION

The invention relates generally to computer networking, and more specifically, to an access point that also performs surveillance on a network.

BACKGROUND OF THE INVENTION

Wireless computing technologies provide untethered access to the Internet and other networks. One of the most critical technologies for wireless networking (or Wi-Fi) is the IEEE 802.11 family of protocols promulgated by the Institute of Electrical and Electronics Engineers. Currently, the protocols are widely adopted in wireless devices such as laptop computers, tablet computers, smart phones, and network appliances.

Typically, access points provide a port for wireless devices to access a network. At a business, several access points can be spread around a geographical region so that employees have Internet access as they travel around to different meeting rooms and even different buildings on a campus. Sometimes, rogue access points are placed in the network by unscrupulous people, or even an employee without any intent for harm. The rogue access points present vulnerabilities to the network because the access points may not be in conformity with a security policy of the network. For example, the access point may not require a password for connections, thereby allowing undesirable accesses to the network.

Currently, network administrators have difficulty in monitoring against rogue devices. One solution is to physically walk around the geographical region checking for signals from rogue access points. However, rogue access points can be powered up for malicious activity, and then powered down until needed again. This makes random walk-throughs ineffective in consistent monitoring. Another solution is to deploy a dedicated device for constant monitoring of rogue access points. Problematically, the dedicated device can only monitor a portion of large geographical areas. Effective monitoring can drastically increase costs because multiple stationary monitors may be needed to cover the entire geographical area.

What is needed is a robust technique to monitor for rogue access points and other anomalous devices without the physical effort or expense drawbacks, as described.

SUMMARY

To meet the above-described needs, methods, computer program products, and systems for channel surveillance of anomalous devices in an access point.

An access point switches between an access point mode and a surveillance mode. In the access point mode, the access point provides network access for end stations using a BSSID (Basic Service Set Identifier) while in the access point mode. In surveillance mode, the access point scans one or more channels of the wireless network to identify one or more anomalous devices. A group of access points can take turns leaving an RF blanket of connectivity for mobile stations to temporarily perform scanning.

In one embodiment, the access point switches from the access point to the surveillance mode responsive to a first condition, and switches back responsive to a second condition. The conditions can be predetermined time intervals, network loads and the like. In preparation to leave access point mode, the access mode hands-off one or more connected end stations to a second access point as directed by a controller. The mobile stations can maintain the same BSSID at the second access point, thereby making the mobile stations unaware of the hand-off.

Advantageously, an access point can protect a wireless network against anomalous devices without disturbing continuous access to an RF blanket.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for surveillance of anomalous devices in an access point are disclosed.

Figure 1A:
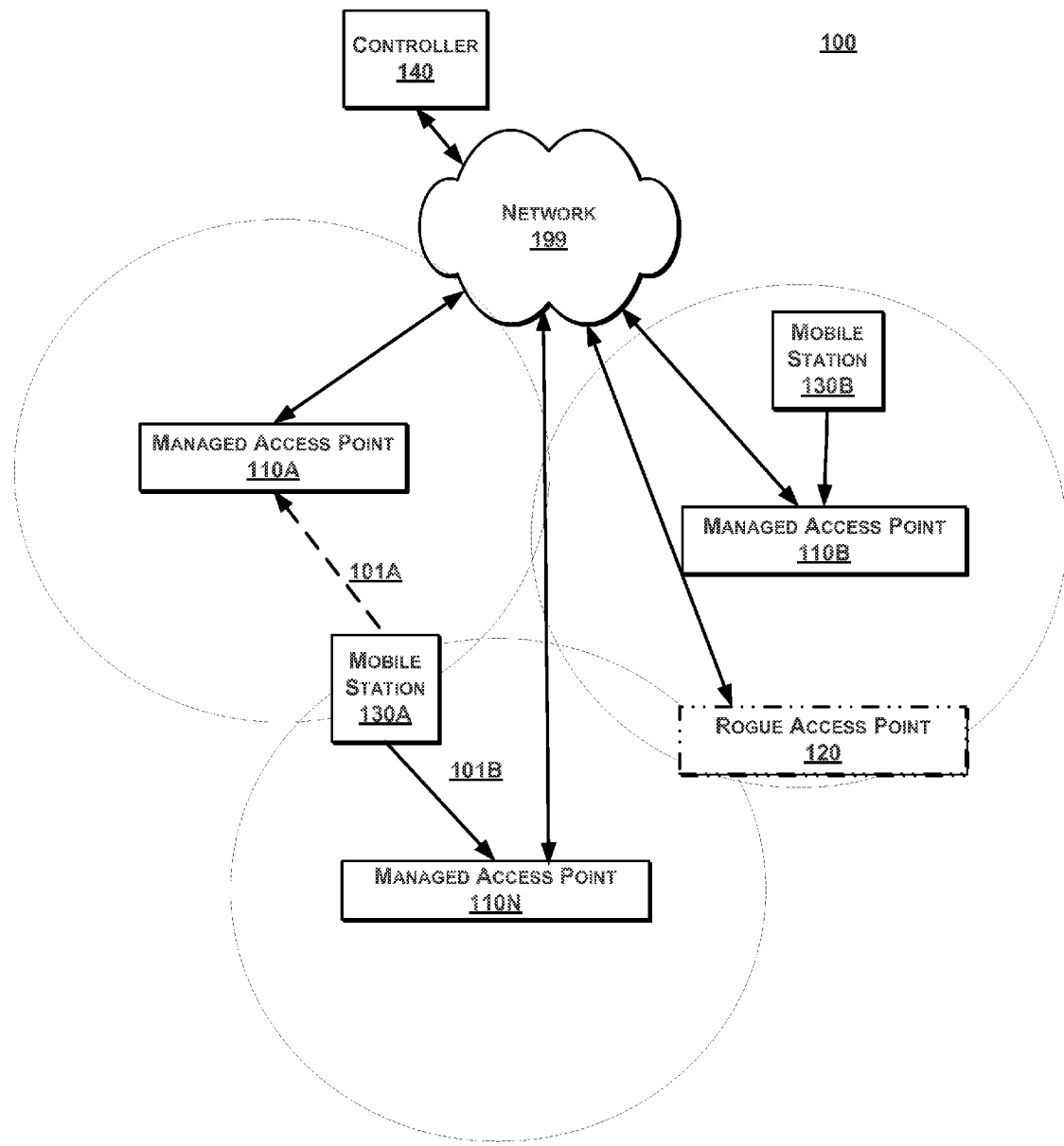
FIG. 1A is a high-level block diagram illustrating a system for channel surveillance of anomalous devices by access points, according to one embodiment.

FIG. 1A is a high-level block diagram illustrating a system for channel surveillance of anomalous devices by access points, according to one embodiment. The system 100 includes a controller 140 coupled to managed access points 110A-N, rogue access point 120, which are in turn coupled to mobile stations 130A,B and also coupled to a network 199 Other embodiments of the system 100 can include additional network components that are not shown in FIG. 1A. For example, there can be more access points, more mobile stations. There can also be switches, routers, fire walls, proxy servers, and the like. At a high level, the managed access points 110A-N provide an RF blanket for continuous connectivity of the mobile stations 130A,B in an access point mode. In some embodiments, one of the access points can temporarily leave the RF blanket for providing services to switch to a surveillance mode for identifying and remediating anomalous devices connected to the RF blanket.

Figure 5:
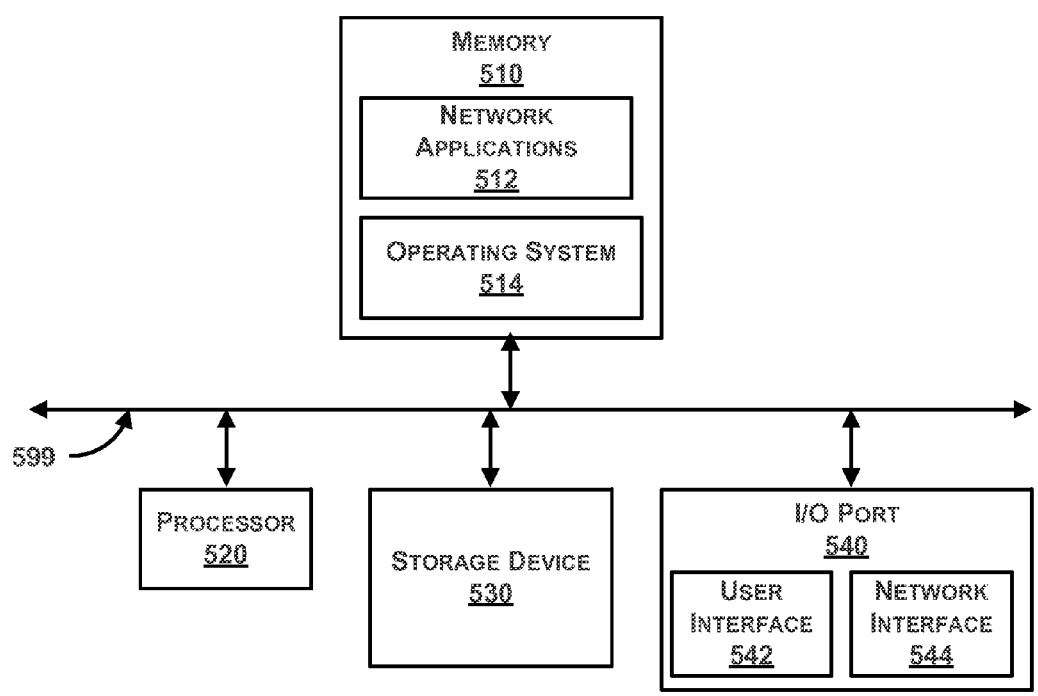
FIG. 5 is a block diagram illustrating an exemplary computing device, according to one embodiment.

The managed access points 110A-N can be any computing devices, such as a personal computer, a server blade, or any computing environment as shown in FIG. 5. Each access point 110A-N is preferably connected by a wire to the network 199 (or to a switch, router, hub, or another access point that is connected to the network 199), but can also be connected wirelessly. The access points 110A-N can be set-up in various configurations to provide wireless coverage areas. In one embodiment, the functionality is incorporated into a switch or router, and in another embodiment, is incorporated into a custom enclosure. In operation, the access point 110A,B transmits network packets from a transmitting mobile station to a receiving mobile station, or transmits network packets between any components on the Internet that are in communication with mobile stations within range. In some embodiments, the access point 110A-N switches between an access point mode in which services are provided to mobile stations, to a surveillance mode to detect anomalous devices. Some operations can be managed or assisted by the controller 140. Additional embodiments of the access point 110 are set forth below in FIG. 1B.

A rogue access point 120 can be a similar device to the managed access points 110A-N. One main difference is that the rogue access point 120 is not authorized for a wireless network by, for example, a network administrator. Consequentially, the rogue access point 120 may be operating out of conformity with the managed access points 110A-N and network security policies enforced on and by them. For example, the rogue access point 120 may not require the same login credentials or may not limit bandwidth usage in conformity with network policy. In FIG. 1A, the rogue access point 120 is within range of, and could be detected by, either access point 120B or access point 120N during scanning.

The mobile stations 130A-B can be, for example, a personal computer, laptop computer, tablet computer, smart phone, mobile computing device, Internet appliance, end station or any other computing device as described in FIG. 5. Mobile station is referred to herein as a preferred embodiment for any connected component, but one of ordinary skill in the art will recognize the application of disclosed techniques to stationary devices. The mobile stations 130A-B are wirelessly coupled to an access point. No pre-configuration or client is needed. In FIG. 1A, mobile station 110A is show as being initially connected by access point 120A before being handed-off to access point 120N when the access point 120A switches to surveillance mode. The mobile stations 130A-B operate according to wireless standards such as IEEE 802.11a, b, g, n, ac or any other wireless standard. Mobile stations 130A-B send and/or receives network packet as data for applications running on the mobile stations.

As an option, controller 140 in the network architecture is in communication with each of multiple access points 120A-C (e.g., the Meru MC6000 Controller by Meru Networks of Sunnyvale, Calif.). As a result, the controller 140 can manage the access point and assist in network services such as virtual cell and virtual port while access points are in access point mode, as described below. The controller 140 can also assist in identifying anomalous devices while access points are in surveillance mode.

Figure 1B:
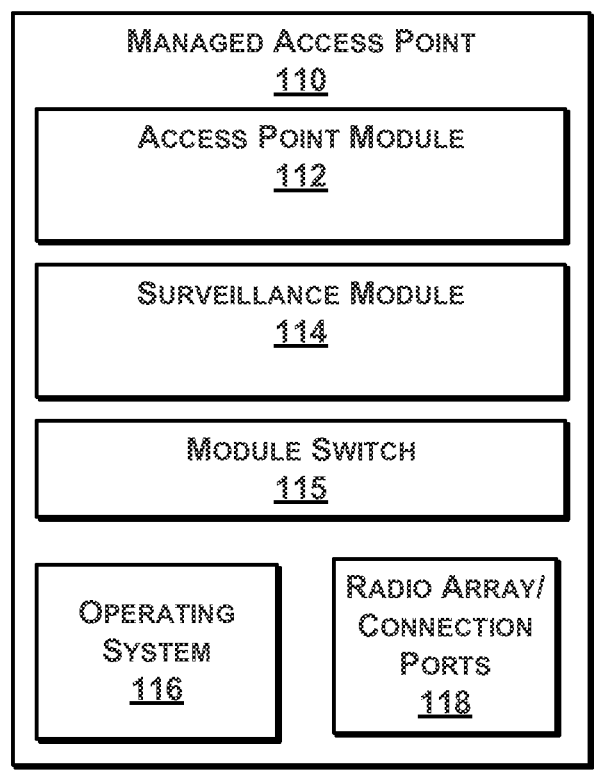
FIG. 1B is a more detailed block diagram illustrating a managed access point of the system of FIG. 1A, according to one embodiment.

FIG. 1B is a more detailed block diagram illustrating a managed access point 110 (can be any of managed access points 1110A,B) of the system of FIG. 1A, according to one embodiment. The access point 110 comprises an access point module 112, a surveillance module 114, an operating system 116, and a radio array 118. The components can be implemented in hardware, software, or a combination of both.

The access point module 112 provides access point services to mobile stations. In some embodiments, the access point module 112 can maintain a list of BSSIDs (Basic Service Set Identifiers) and corresponding mobile stations. When the mobile stations transmit information to and receive information from the wireless network, the access point module 112 handles the retransmission of packets. The access point module 112 can operate in conjunction with a controller with respect to BSSID assignments for virtual cell and/or virtual port services.

The surveillance module 114 scans an RF blanket for anomalous devices. Exemplary anomalous devices include rogue devices and non-mobile stations. The surveillance module 114 can operate in conjunction with a controller to identify anomalous devices.

The mode switch 115 executes switches between the access point module 112 and the surveillance module 114. The access point mode can be a default mode. Responsive to a first condition, the mode switch 112 reconfigures control of radios, and responsive to a second condition, returns to the default mode. The conditions are implementation-specific, but can trigger a change due to a preconfigured period of time, a rolling sequence of access points, an command from a network administrator, and the like.

The operating system 116 can be a general operating system, or a streamlined operating system for access pint such as System Director OS by Meru Networks of Sunnyvale, Calif. The operating system 116 generally interfaces between the software and hardware of the access point 110. The operating system 116 can also include integrated applications, such as the access point module 112, the surveillance module 114 and the mode switch 115.

The radio array/connection ports 118 represent physical access to communication channels or mediums. A radio array can include one or more transmit (Tx) and receive (Rx) antennas for communication with the physical layer. Some mobile stations 110 include separate antennae for IEEE 802.11a, IEEE 802.11b, IEEE 802.11n, and IEEE 802.11 ac. Other mobile stations 110 include several antenna dedicated for separate transmit and receive paths using the MIMO functionality of IEEE 802.11ac. Antennae can be tuned for IEEE 802.11 transmissions. An Ethernet port can allow plug-in connections to a wired medium using a RJ-45 jack, or the like.

Figure 2:
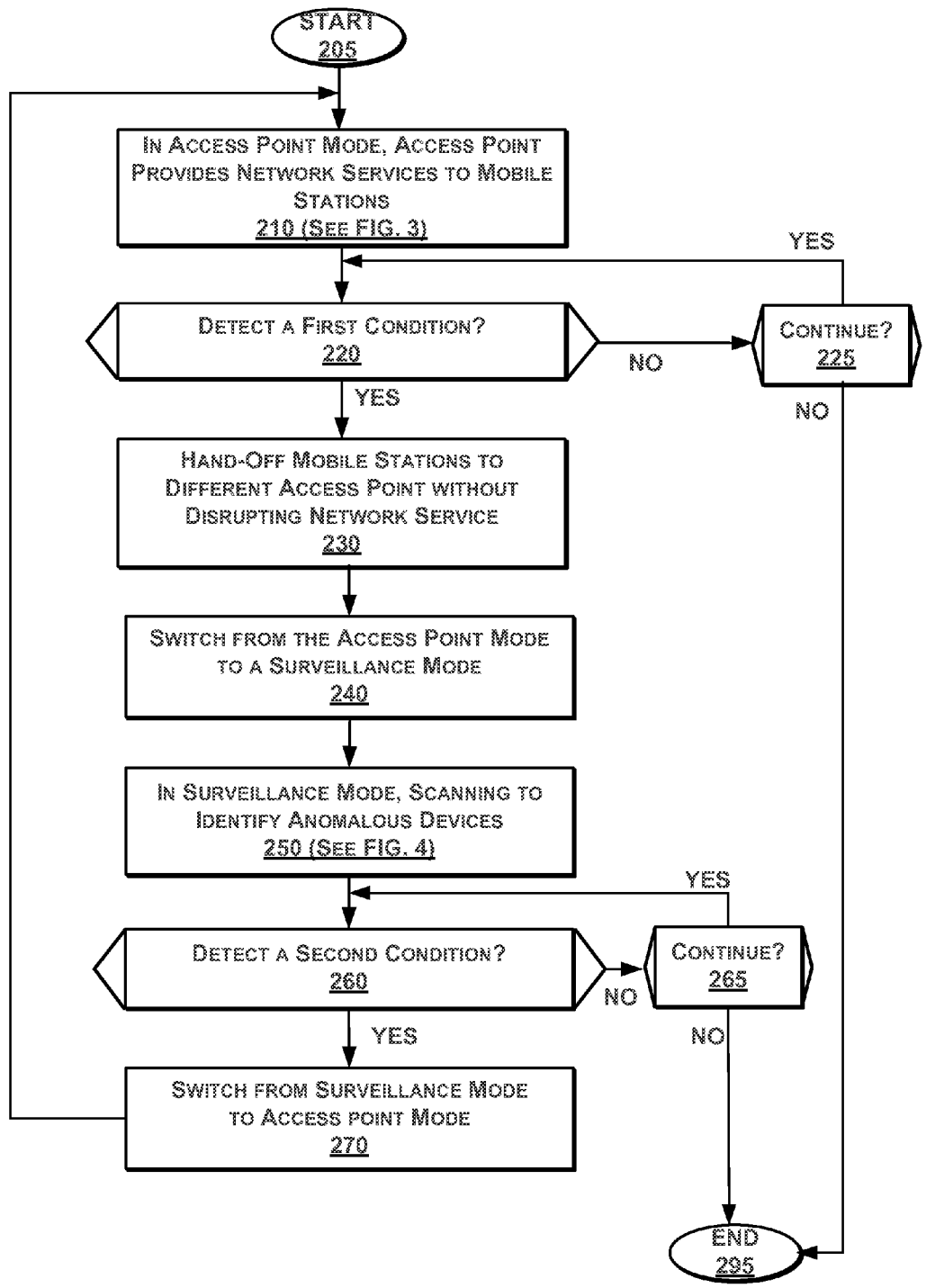
FIG. 2 is a high-level flow diagram illustrating a method for channel surveillance for anomalous devices in an access point, according to one embodiment.

FIG. 2 is a high-level flow diagram illustrating a method 200 for channel surveillance for anomalous devices in an access point, according to one embodiment.

At step 210, in an access point mode, the access point provides network services to mobile stations. In some embodiments, the access point provides virtual cell and virtual port services. In general, the virtual cell service maintains a BSSID assigned to a mobile statin across different access points in an RF blanket. Meanwhile, the virtual port service assigns a unique BSSID to a mobile station to allow a controller to manage the mobile station. While performing surveillance, it is the virtual cell and virtual port architectures allow a wireless network to continue providing services to mobile stations that remain substantially unaware of any change. These network services are described in more detail in association with FIG. 4.

At step 220, the process waits until a first condition is detected. The first condition can be one or more conditions, and is implementation-specific. In a first embodiment, scans can occur periodically after a predetermined duration of time. In another embodiment, a specific threat detection, or evidence that suggestive anomalous device connections triggers the scan. In yet another embodiment, an access point determines that a switch can be made without disruption (or with minimal disruption) to the RF blanket used by mobile stations.

At step 230, in response to detecting a first condition, the access point hands-off mobile stations that are currently connected. The technique is sometimes referred to as a 'soft' hand-off because mobile stations may be unaware of any change. Specifically, the BSSID associated with an access point that is switching to surveillance mode can be reassigned to another access point within range, for example, by a controller. Without the soft hand-off, a mobile station that has been dropped by an access point has to respond to a beacon, with a new BSSID, to configure a new connection.

At step 240, the access point switches from the access point mode to a surveillance mode. Once the access point has redistributed a load for the access point mode, it is free to change modes without disruption of services. To switch, control of the access point radios are associated with the surveillance module for its purposes.

At step 250, the access point scans channels of the network for anomalous devices. The radios can be tuned to the same channels utilized in the access point mode, in addition to others. In a preferred embodiment, the access point scans for rogue devices and for non-mobile stations. Of course, any type of anomalous device can be searched, depending on the implementation. Remediation action can be taken against detected anomalous devices. In some embodiments, remediation can occur while still in surveillance mode. If the anomalous device is harmful to the wireless network as a whole, it can be eradicated by removing an associated connection. If the anomalous device is not appropriate for the connected access point, the device can be handed-off to another access point. For example, a stationary station can be moved to an access point having a shorter flight time, or be reassigned to a different BBSID.

At step 260, responsive to detecting a second condition, the access point switches back from the surveillance mode to an access point mode at step 270. The second condition triggers the end of scanning. Example conditions include the end of a preconfigured time period for scanning, successful identification and eradication of all anomalous devices, notification that a neighboring access point is entering surveillance mode and needs to hand-off mobile station, and the like. Ultimately, control of the radios is changed back to an access point module from a surveillance module.

At step 280, the access point mode switches from the surveillance mode to the access point mode. As such, control of the access point radios is switched back to the access point module.

Figure 3:
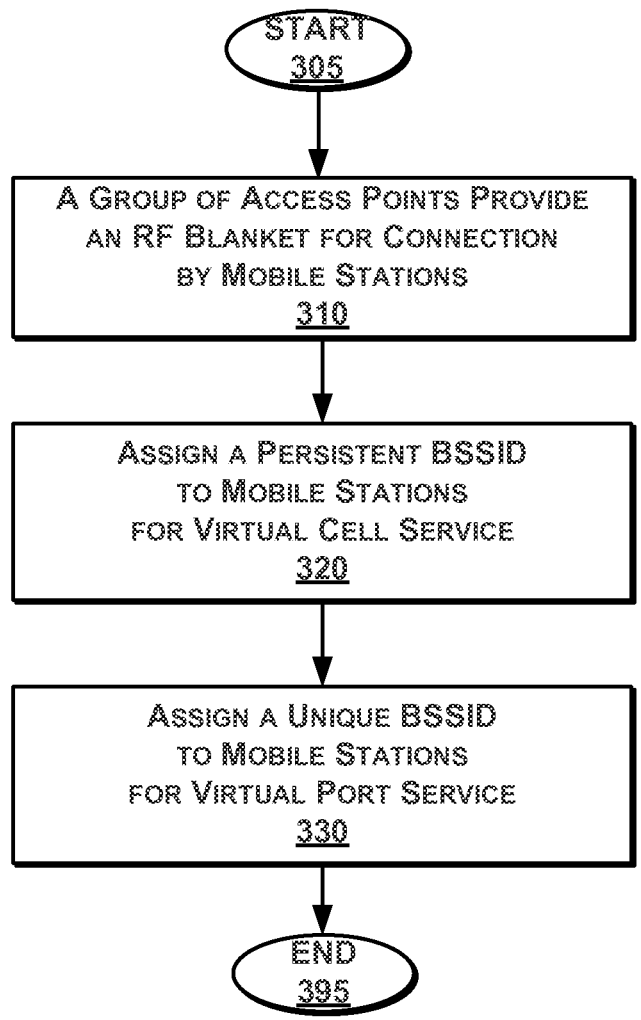
FIG. 3 is a more detailed flow diagram illustrating a method for providing virtual cells and virtual ports in an access point mode in the method of FIG. 2, according to one embodiment.

FIG. 3 is a more detailed flow diagram illustrating a method for step 210 in providing virtual cell and virtual port service in an access point mode in the method of FIG. 2, according to one embodiment.

At step 310, a group of access points provide an RF blanket for connection by mobile stations. A collective range of radios from the access points not only allow connections, but maintain continuous connections as mobile stations are in transit across the RF blanket.

At step 320, assigning a BSSID to a mobile point that is persistent across different access points a virtual cell of the RF blanket. The BSSID can be shared among one or more mobile stations, and more importantly, is shared among access points. As a result, a mobile station moving out-of-range for a first access point and in-range for a second access point can be handed-off between the access points. To do so, a controller pulls the BSSID from the first access point and reassigns the BSSID to the second access points. Although more than one access point may receive transmissions to a BSSID, only the access point assigned to the BSSID by the controller will respond.

At step 330, assigning a BSSID to an end point that is unique to the end point in virtual port of the RF blanket. The BSSIDs are managed by a controller, as far as the type of services offered. For example, a controller can allow unlimited uplink access for one BSSID and minimal uplink access for a second BSSID. As with virtual cell, the virtual port is transported around the RF blanked through updated assignments to access points.

Figure 4:
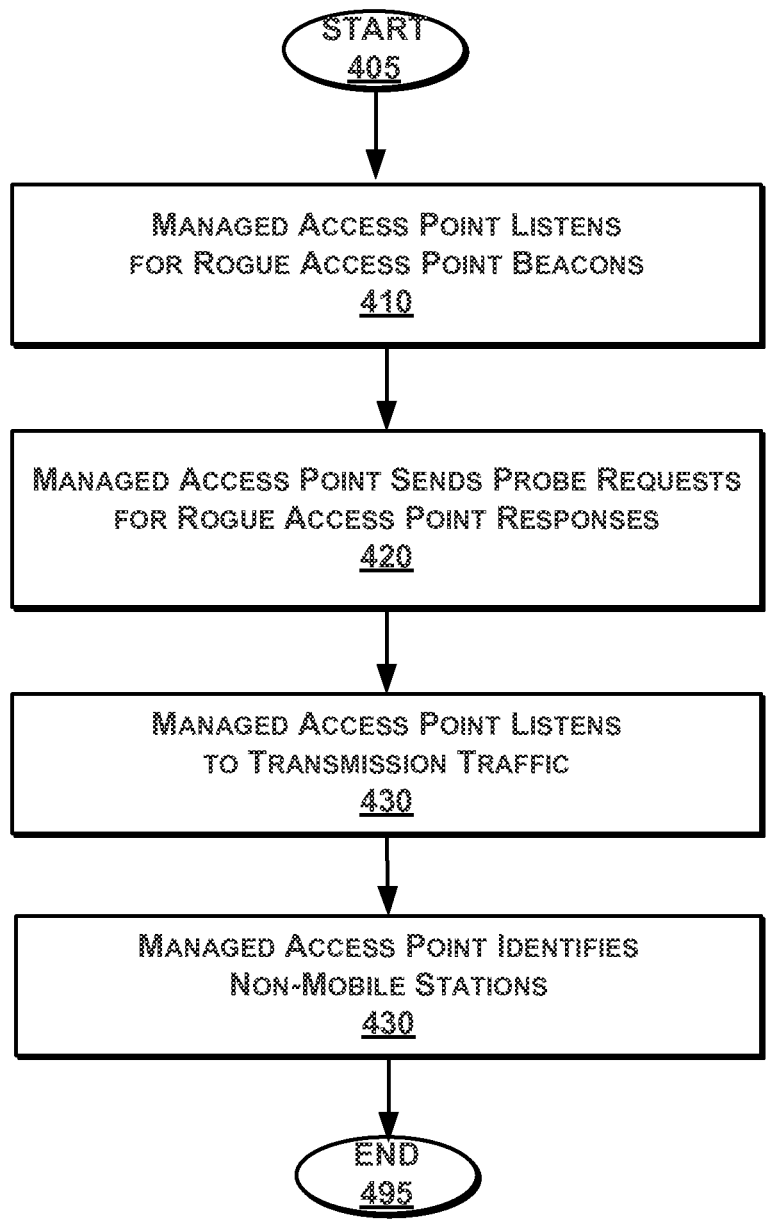
FIG. 4 is a more detailed flow diagram illustrating a method for channel scanning in a surveillance mode in the method of FIG. 2, according to an embodiment.

FIG. 4 is a more detailed flow diagram illustrating a method for step 250 in detecting an anomalous device in a surveillance mode in the method of FIG. 2, according to an embodiment. The following steps are examples of surveillance and need not be performed sequentially or completely.

At step 410, an access point listens for beacons from rogue access points for comparison against known access points. In accordance with IEEE 802.11 standards, an access point advertises its presence with beacon frames broadcast at periodic intervals. The beacon frames include a BSSID associated with an access point. The BSSID can be compared against a list of BSSIDs from managed access points that are trusted to operate in a wireless network. In one embodiment, a controller in communication with access points on the wireless network provides a list of valid access points to an access point for comparison, or performs the comparison at the controller.

At step 420, the access point sends probe requests over different channels. Rather than passive listening, the access point actively elicits a probe response from rogue access points. In response to probe requests, access points within range send a probe response frame which includes a BSSID. As described above, the BSSID can be compared against a list of known BSSID for the wireless network.

At step 430, the access point listens to transmission traffic from rogue access points. By scanning channels across the spectrum, the access point can listen to communication exchanges taking place by rogue access point and rogue mobile stations connected thereto. Although wireless packets have a specific destination, as indicated by a destination address field, the packet is propagated among an entire range of a transmitting radio. As a result, any receiving radio within range of the transmitting radio can pick up the transmission for analysis. As with the beacon comparison, source and destination addresses of observed communication packets can be compared against known source and destination addresses.

At step 440, the access point determines which stations are non-mobile. Some services provided to mobile station, such as virtual cell and virtual port, can cost additional overhead that is not necessary for a non-mobile station. The station can be temporarily non-mobile (e.g., a mobile station that is stationary for some time), or permanently mobile (e.g., a desktop personal computer). Various techniques can analyze mobility. For example, RSSI can be measured for communications to determine whether flight time remains the same.

FIG. 5 is a block diagram illustrating an exemplary computing device 500 for use in the system 100 of FIG. 1A, according to one embodiment. The computing device 500 is an exemplary device that is implementable for each of the components of the system 100, including the access point 110, and the mobile stations 120A, B. Additionally, the computing device 500 is merely an example implementation itself, since the system 100 can also be fully or partially implemented with laptop computers, tablet computers, smart cell phones, Internet appliances, and the like.

The computing device 500, of the present embodiment, includes a memory 510, a processor 520, a storage device 530, and an I/O port 540. Each of the components is coupled for electronic communication via a bus 599. Communication can be digital and/or analog, and use any suitable protocol.

The memory 510 further comprises network applications 512 and an operating system 514. The network applications 520 can include the programs that use network services, a web browser, a mobile application, an application that uses networking, a remote application executing locally, a network protocol application, a network management application, a network routing application, or the like.

The operating system 514 can be one of the Microsoft Windows® family of operating systems (e.g., Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 520 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 520 can be single core, multiple core, or include more than one processing elements. The processor 520 can be disposed on silicon or any other suitable material. The processor 520 can receive and execute instructions and data stored in the memory 510 or the hard drive 530.

The storage device 530 can be any non-volatile type of storage such as a magnetic disc, EEPROM, Flash, or the like. The storage device 530 stores code and data for applications, firmware, and the like.

The I/O port 540 further comprises a user interface 542 and a network interface 544. The user interface 542 can output to a display device and receive input from, for example, a keyboard. The network interface5 connects to a medium such as Ethernet or Wi-Fi for data input and output. In one embodiment, the network interface 544 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Java, JavaScript, PHP, Python, Perl, Ruby, and AJAX. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A computer-implemented method in an access point for channel surveillance for anomalous devices in a wireless network, comprising:
    in an access point mode, providing network access for end stations using a BSSID (Basic Service Set Identifier) while in the access point mode;
    in a surveillance mode, scanning one or more channels of the wireless network to identify one or more anomalous devices;
    switching from the access point mode to the surveillance mode responsive to detecting a first condition, and handing-off one or more connected mobile stations to a second access point as directed by a controller, wherein the controller is in communication with and manager of a plurality of access points, and wherein the mobile stations maintain the same BSSID at the second access point, thereby making the mobile stations unaware of the hand-off.

2. The method of claim 1, wherein the anomalous device comprises a rogue access point.

3. The method of claim 1, wherein the anomalous device comprises a non-mobile device.

4. The method of claim 3, wherein the non-mobile device is stationary for a predetermined amount of time.

5. The method of claim 1, wherein, in the access point mode, the plurality of access points provide a virtual cell to a plurality of end stations, allowing the plurality of access point to access the network using the same BSSID at any one of the plurality of access points.

6. The method of claim 1, wherein, in the access point mode, the plurality of access points provide a virtual port to a plurality of end stations, allowing a controller to manage each of the plurality of end stations using a BSSID that is uniquely assigned to each of the end stations, wherein the controller is in communication with each of the plurality of access points.

7. The method of claim 1, wherein, in the surveillance mode, the access point listens to beacons to identify a rogue access point that is not part of a plurality of managed access points.

8. The method of claim 1, wherein, in the surveillance mode, the access point sends probe requests to elicit probe responses from a rogue access point that is not part of a plurality of managed access points.

9. The method of claim 1, wherein detecting the first condition comprises:
    detecting the first condition responsive to at least one of: expiration of a predetermined amount of time, a turn in a rolling sequence of a plurality of access points, and a determination that network services will not be disrupted.

10. The method of claim 1, further comprising:
performing remediation on the one or more anomalous devices.

11. The method of claim 1, further comprising:
detecting a second condition, and in response, switching from the surveillance mode to the access point mode.

12. The method of claim 1, wherein the wireless network complies with an IEEE 802.11 standard.

13. A non-transitory computer-readable medium storing instructions that, when executed by a processor, perform a method for network channel surveillance of anomalous devices, comprising:
in an access point mode, providing network access for end stations using a BSSID (Basic Service Set Identifier) while in the access point mode;
in a surveillance mode, scanning one or more channels of the wireless network to identify one or more anomalous devices;
switching from the access point mode to the surveillance mode responsive to detecting a first condition, and handing-off one or more connected end stations to a second access point as directed by a controller, wherein the controller is in communication with and manager of a plurality of access points, and wherein the mobile stations maintain the same BSSID at the second access point, thereby making the mobile stations unaware of the hand-off.

14. An access point for network channel surveillance for anomalous devices, comprising:
an access point module to use radios providing network access for end stations using a BSSID (Basic Service Set Identifier) while in the access point mode;
the surveillance module to use the radios to scan one or more channels of the wireless network to identify one or more anomalous devices; and
a mode switch to detect a first condition, wherein responsive to the detection, the access point module hands-off one or more connected end stations to a second access point as directed by a controller, wherein the controller is in communication with and manager of a plurality of access points, and wherein the mobile stations maintain the same BSSID at the second access point, thereby making the mobile stations unaware of the hand-off, and wherein the mode switch switches control of radios to the surveillance module.

\* \* \* \* \*